United States Patent
Bormioli

(10) Patent No.: US 7,325,286 B2
(45) Date of Patent: Feb. 5, 2008

(54) REMOTE CONTROL DEVICE FOR THE QUICK-COUPLING AND QUICK-RELEASE OF A PIPE FITTING TO A FLANGED PIPE

(76) Inventor: Lorenzo Bormioli, Via Carlo Cerato 14, Padova (IT) 35100

( * ) Notice: Subject to any disclaimer, the term of this patent is extended or adjusted under 35 U.S.C. 154(b) by 156 days.

(21) Appl. No.: 10/546,830

(22) PCT Filed: Dec. 29, 2003

(86) PCT No.: PCT/EP03/14996

§ 371 (c)(1), (2), (4) Date: Aug. 25, 2005

(87) PCT Pub. No.: WO2004/076906

PCT Pub. Date: Sep. 10, 2004

(65) Prior Publication Data

US 2006/0192378 A1    Aug. 31, 2006

(30) Foreign Application Priority Data

Feb. 28, 2003  (IT) .......................... MI2003A0363

(51) Int. Cl.
*B23P 19/04* (2006.01)

(52) U.S. Cl. .......................................... 29/237; 285/39
(58) Field of Classification Search .................. 29/237, 29/238, 243.55, 255; 285/39, 320, 314
See application file for complete search history.

(56) References Cited

U.S. PATENT DOCUMENTS

| 4,039,087 A | * | 8/1977 | Sandvick, Sr. ............... | 29/237 |
| 4,790,057 A | * | 12/1988 | Baker .......................... | 29/237 |
| 5,001,801 A | * | 3/1991 | Jarvis et al. ................. | 15/93.1 |
| 5,313,986 A | * | 5/1994 | Jude ............................ | 138/99 |

(Continued)

FOREIGN PATENT DOCUMENTS

EP           0773398 A1     5/1997

(Continued)

*Primary Examiner*—Lee D. Wilson
(74) *Attorney, Agent, or Firm*—Jacobson Holman PLLC

(57) ABSTRACT

A device for the quick coupling of a pipe fitting (50) to a flanged pipe is described. The device comprises a coupling plate (13) that is rigidly fastened to one end of the fitting so as to be axially approachable to the front of a terminal flange (12) of the flanged pipe, at least three locking wheels (15) rotatable around their own axes and projecting frontally from the plate (13) in circumferentially spaced positions and remotely controllable member (19) for controlling the rotation of the rollers (15) around their own axes. Each locking wheel (15) has round shape with a cut (24) along a circle chord in order to allow in one angular position with the chord facing the axis, and to prevent in all the other angular positions, the passage of the flange (12) of the flanged pipe among the wheels (15) for the reciprocal approach and the movement away of the plate (13) and the flange (12). Each locking wheel (15) has in addition, toward the plate (13) a helical neck (25) that is capable to cause, as a result of the rotation of the wheel (15) from the one angular position to the other angular positions, the front abutment engagement and the locking of the flange (12) against the plate (13).

2 Claims, 5 Drawing Sheets

U.S. PATENT DOCUMENTS

| | | | |
|---|---|---|---|
| 5,491,880 A * | 2/1996 | Labiche | 29/402.09 |
| 5,507,313 A * | 4/1996 | LeDevehat | 137/614.05 |
| 7,076,852 B2 * | 7/2006 | Penman et al. | 29/426.5 |
| 2006/0192378 A1 * | 8/2006 | Bormioli | 285/39 |

FOREIGN PATENT DOCUMENTS

| | | |
|---|---|---|
| GB | 842542 | 7/1960 |
| GB | 2098296 A | 11/1982 |

* cited by examiner

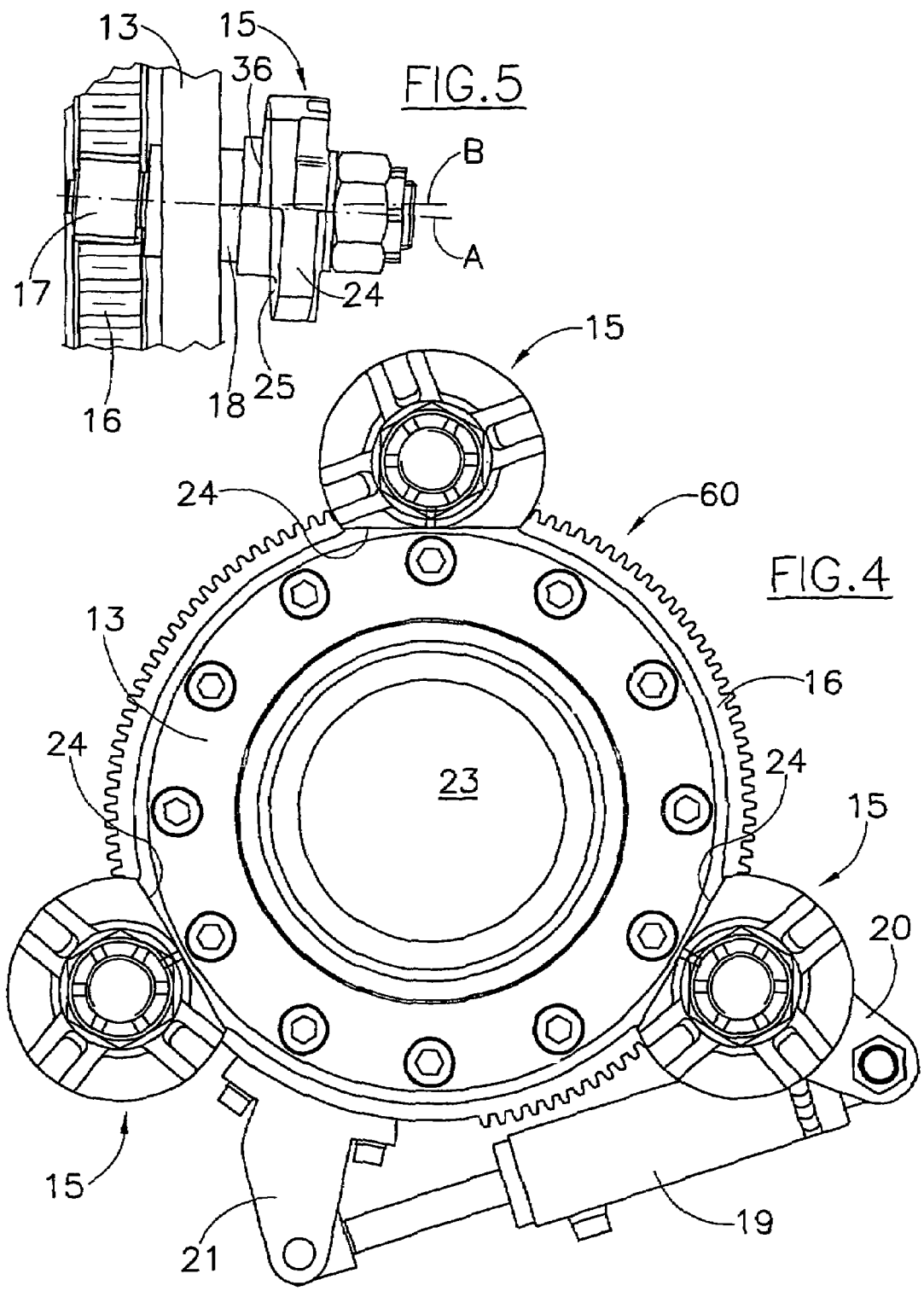

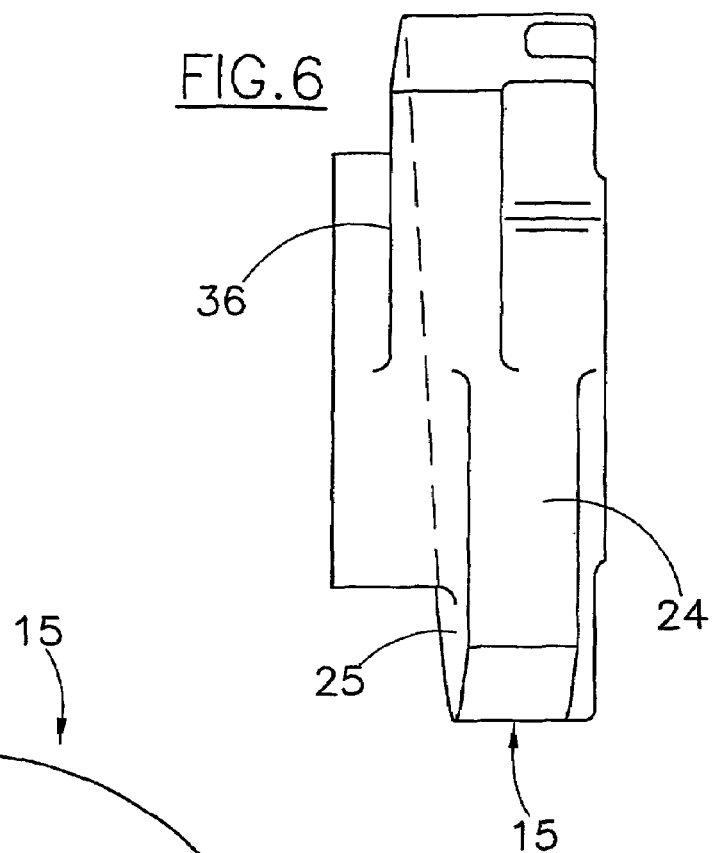
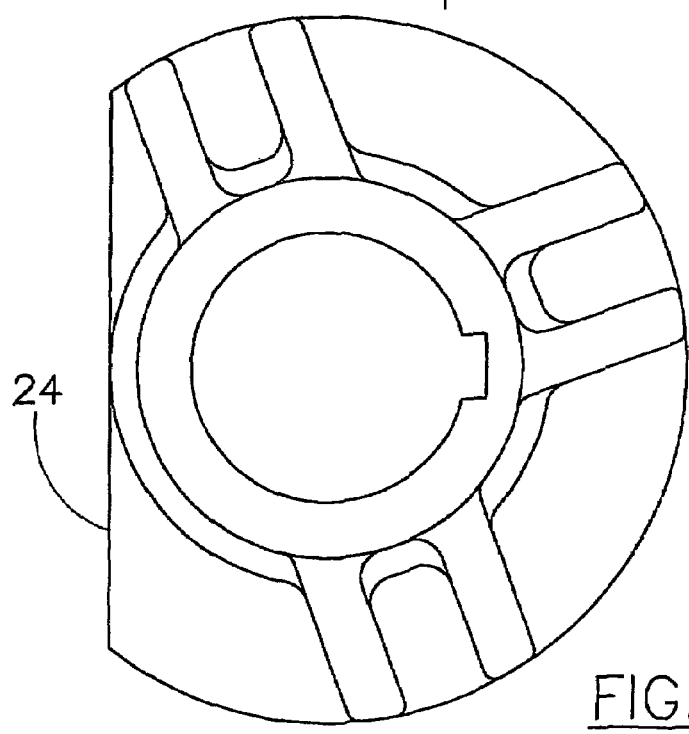

REMOTE CONTROL DEVICE FOR THE QUICK-COUPLING AND QUICK-RELEASE OF A PIPE FITTING TO A FLANGED PIPE

This is a nationalization of PCT/EP03/014996 filed Dec. 29, 2003 and published in English.

DESCRIPTION

The present invention concerns a remote control device for the quick-coupling and quick-release of a pipe fitting to a flanged pipe.

By the term "coupling" a connector for flanges is meant that is capable to easily couple and uncouple the same flanges in a secure and quick way, both in normal conditions and in emergency conditions.

There are known pipe fittings that are utilised to join to each other in quickly separable way pipings destined to the transport of oil products, in particular from a ship to land and vice-versa or from an extraction platform to a ship or from ship to ship or from a ship or platform to the extraction wells at the bottom of the sea and so on. One of these is described for instance in EP-A-0153773 and it comprises two fitting parts attachable to respective pipings and quick-coupling and quick-release means that are suitable to couple to each other the two fitting parts, each one of which is provided with a respective interception valve.

Such fittings are usually attached in permanent way to a pipe, whereas it is necessary to couple them each time to the other pipe. The two pipes are usually on locations that are in motion as regards one the other, in particular one on the land or on an offshore extraction platform and the other one on a ship. The adverse conditions of the sea can make the coupling of the fitting to the other pipe extremely complicated.

Coupling devices usable in order to provide in a secure and quick way the coupling of a fitting to a flanged pipe are already known. One of these is described for instance in IT-B-844387.

Object of the present invention has been to provide a simple, safe, small volume, remotely controllable device that can be used in a fitting of the aforesaid type in order to allow the quick coupling of the same fitting to a flanged pipe that is movable with respect to the fitting (or vice-versa).

According to the invention such object has been attained with a device characterised in that it comprises a coupling plate that is rigidly fastened to one end of the fitting in such a way as to be axially movable near the front of a terminal flange of the flanged pipe, at least three locking wheels rotatable around their own axes and frontally projecting from said plate in circumferentially spaced positions and remote by controllable means for controlling the rotation of said wheels around their own axes, each locking wheel having round shape with a cut along a circle chord in order to allow in one angular position with the chord facing the axis of the coupling, and to prevent in all the other angular positions, the passage of the flange of the flanged pipe among said wheels for the reciprocal approach and the separation of the plate and the flange, each locking wheel having in addition, toward said plate, a helical neck capable to cause, as a result of the rotation of the wheel from said one angular position to said other angular positions, the frontal abutment engagement and the locking of said flange against said plate.

In addition it is preferably provided that the helical neck of each wheel terminates away from the wheel with a flat terminal portion that with the wheel in locking position, is perpendicular to the axis of the fitting. In that way between said terminal portion of the helical neck and the flange with which it is in abutment a plane engagement perpendicular to the axis of the fitting is provided, that prevents the flange from transmitting to the wheels stresses/strains capable to determine the inverse rotation of the wheels and the consequent loosening of their abutment engagement against the flange.

The characteristics of the present invention will be made evident by the following detailed description of an embodiment thereof that is illustrated as a non limiting example in the enclosed drawings, in which:

FIG. 4 shows the quick coupling device of the aforesaid fitting as seen frontally as in FIG. 3 but with the locking wheels rotated in an angular position suitable for the passage of the flange of the pipe to be coupled;

FIG. 5 shows the degree of inclination of said locking wheels with respect to the plate that supports them;

FIGS. 6 and 7 show, respectively in lateral view and from the right, the magnified detail of one of the locking wheels comprised in the coupling device in the previous Figures.

Figure 1:
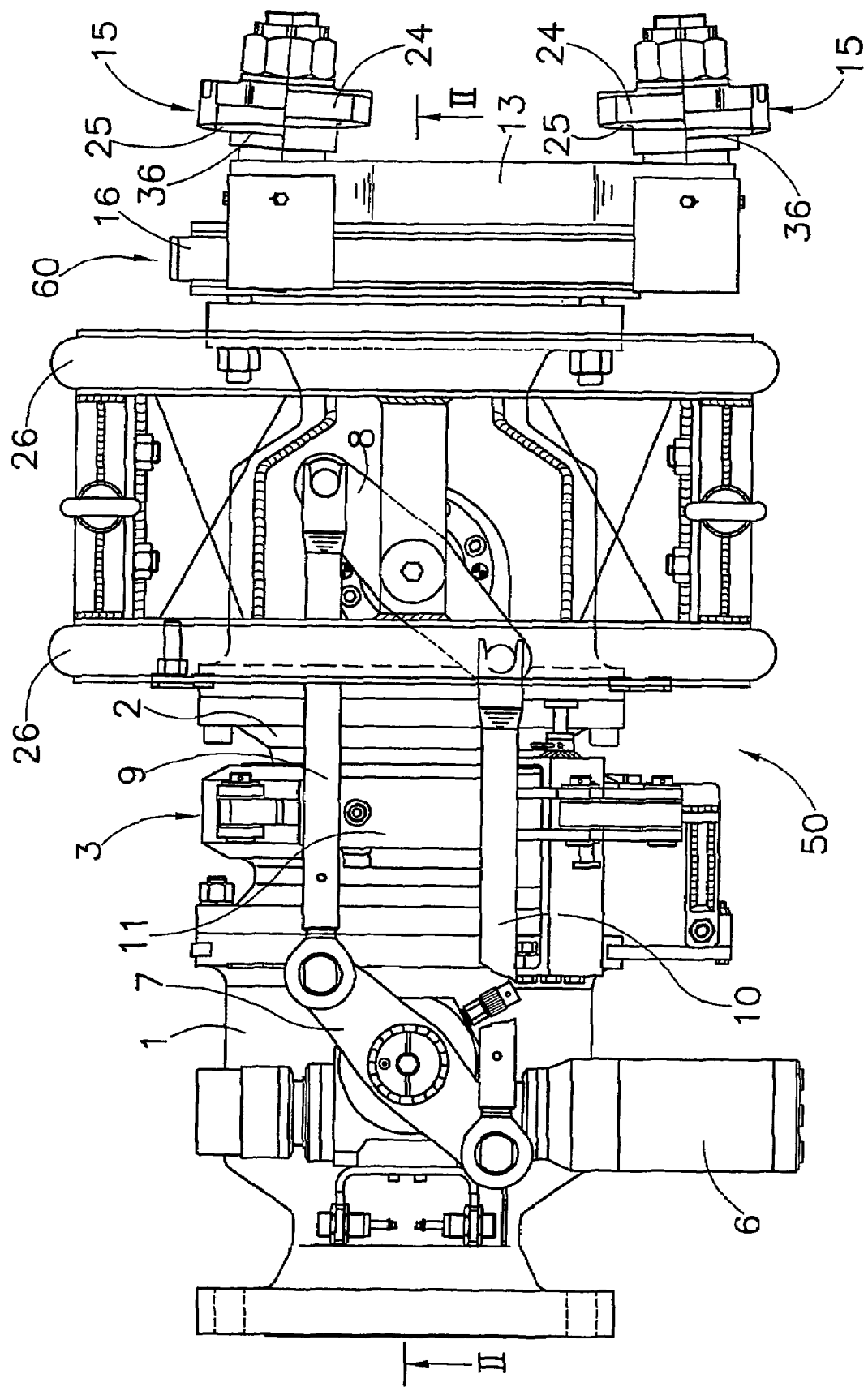
FIG. 1 shows in top plan a pipe fitting provided with a quick coupling device according to the present invention.

The coupling shown in the drawings, where it is indicated as a whole by the numerical reference 50, comprises (FIGS. 1 and 2) a first fitting part 1 and second fitting part 2, passed through by respective aligned axial passages 22 and 23 and coupled to each other by a quick-release coupling device 3, for instance of the type described in EP-A-0153773 or in the Italian patent application No. MI2002 A 002196 of 16.10.02, currently pending. The two fitting parts 1 and 2 are provided with their own closing valves 4 and 5 that are set in action by a single hydraulic motor 6 and coupled to each other by levers 7 and 8 and connecting rods 9 and 10 (FIG. 1). A hydraulic cylinder 11 (FIGS. 1-3) provides for the operation of the coupling device 3.

While the first fitting part 1 is destined to being coupled in permanent way to a first pipe that therefore forms a single body with the fitting (or better with its part 1), the second fitting part 2 is destined to be coupled, when requested, to the flange 12 of a second pipe (rendered in dotted line in FIG. 2), that is in continuous and unforeseeable movement with respect to the coupling.

To such purpose, and in view of the need to provide such coupling in a secure and quick way and regardless of the aforesaid reciprocal movement, the fitting part 2 has a quick coupling device 60, that comprises a double end plate 13 and 14, the first one of which rotatably supports three locking wheels 15, which axially project from the front of the plate 13 in circumferentially spaced positions, with axes A slightly inclined with respect to the respective perpendicular B to the plate 13, as shown in FIGS. 1 and 5. The second plate 14 instead revolvingly and coaxially support a toothed rim 16 (FIGS. 1-4), that meshes with pinions 17 splined to shafts 18 of the wheels 15. A remotely controllable hydraulic cylinder 19 provides for the rotation of the toothed rim 16, when desired, through arms 20 and 21 respectively fastened to the plate 14 and to the rim 16 (FIGS. 3 and 4).

Figure 3:
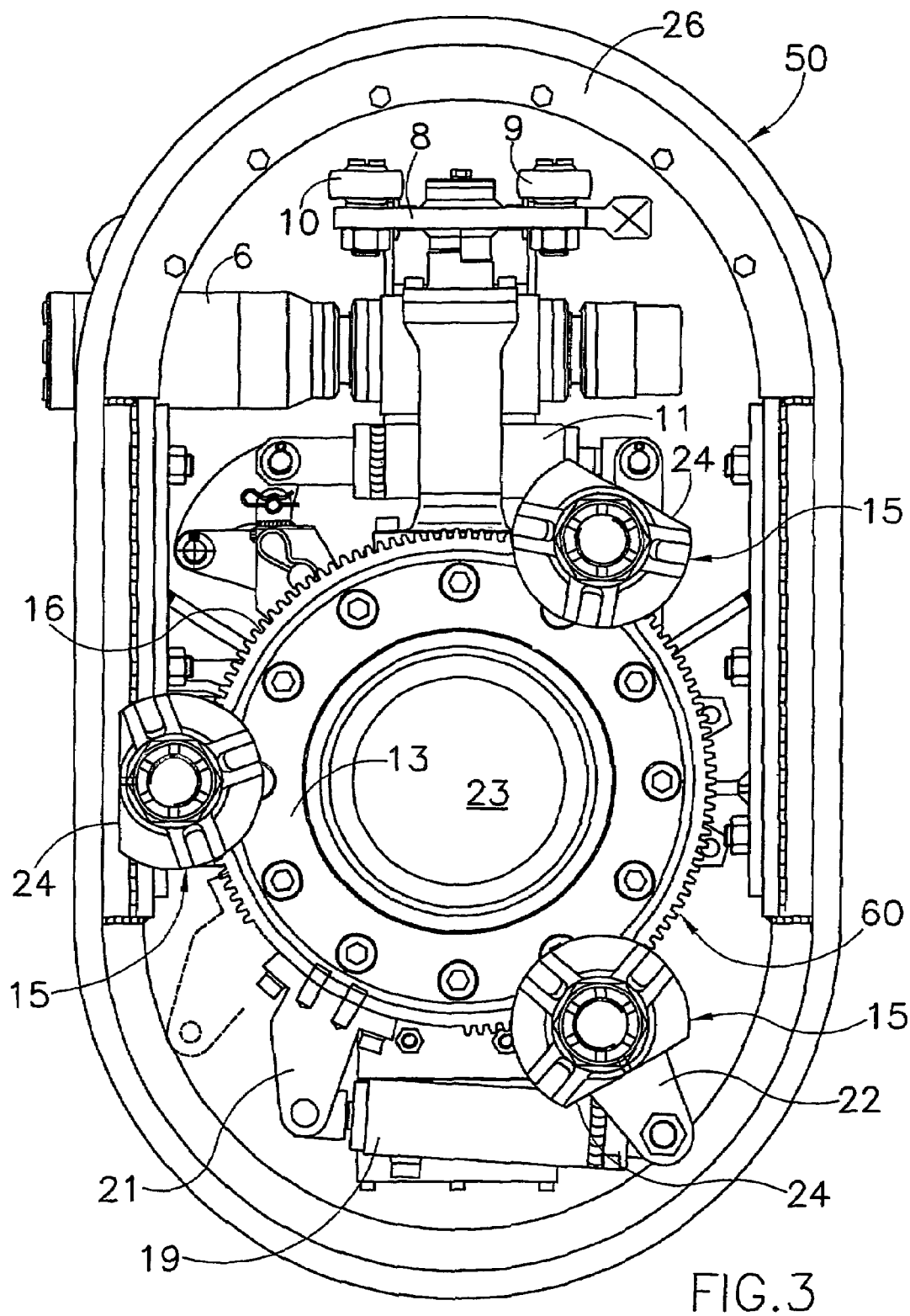
FIG. 3 shows the aforesaid fitting as seen frontally from the right of FIG. 2.

As shown in FIGS. 3, 4 and 7, every locking wheel 15 has a round frontal conformation with a cut 24 along a chord of circle. The cut 24 is made so that, when the wheels are in the angular position of FIG. 4, that is with all the cuts 24 toward the axis of the fitting, the terminal flange 12 of the second pipe can pass among the wheels 15 in order to frontally get near to the plate 13 and to get away from it. When the wheels 15 are instead in any other angular position (FIG. 3), this is not possible.

Figure 2:
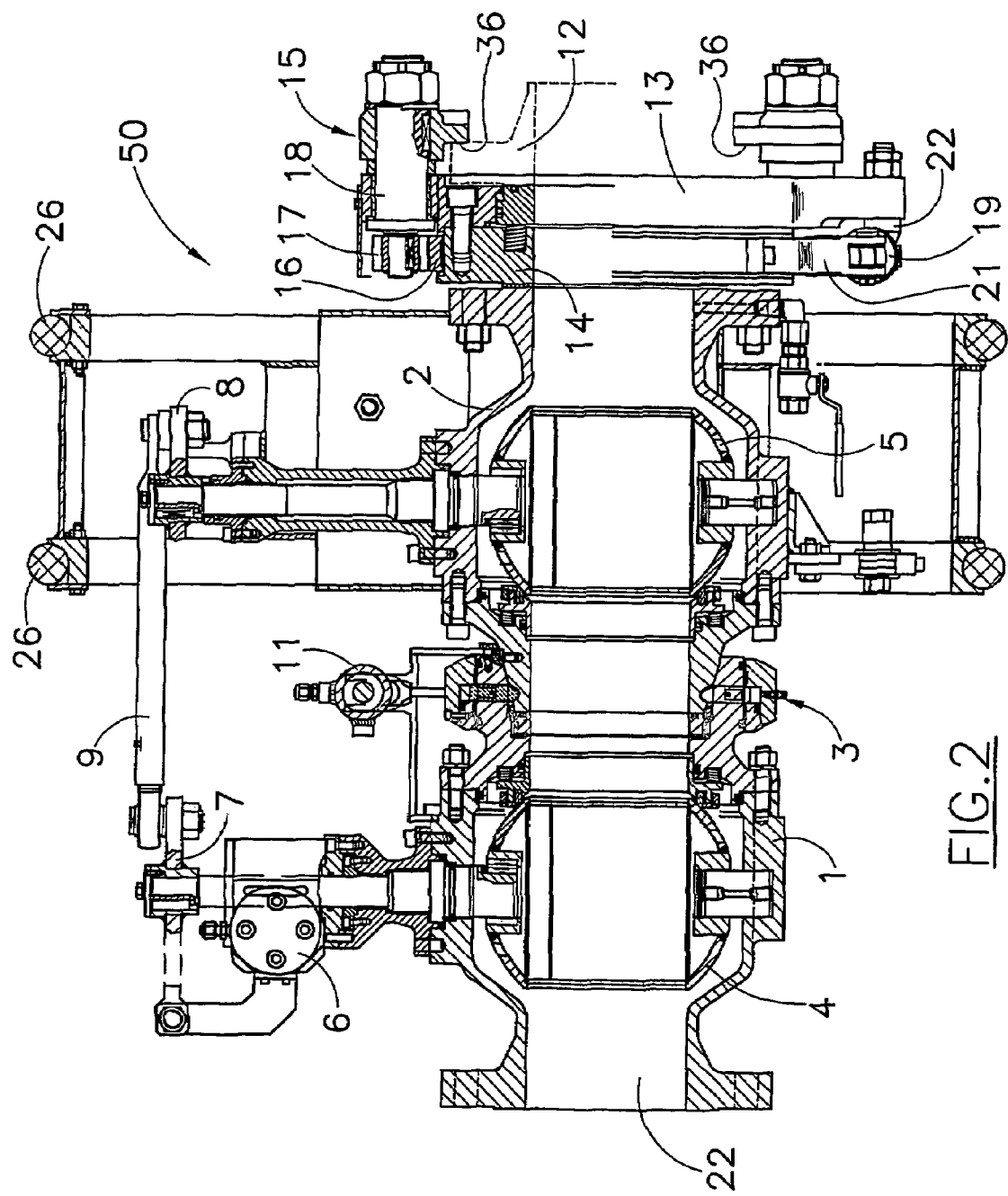
FIG. 2 shows the aforesaid fitting in axial section along the line II-II of FIG. 1.

As well shown in FIGS. 1, 5 and 6, each locking wheel 15 has a helical neck 25 capable to cause, as a consequence of the rotation of the wheel 15 from the angular position of FIG. 4 to said other angular positions, in particular to the one in FIGS. 2 and 3, the front abutment engagement and the locking of the flange 12 against the plate 13. More precisely, when the helixes are in the locking position of FIGS. 2 and 3, their terminal portions (36) distant from the bases of the wheels are in a plane perpendicular to the axis of the fitting, so as to provide a corresponding flat engagement with the back of the flange to be coupled.

Finally the fitting part 2 is provided with an elliptic double profile 26 of rubber, that has functions of bumper in order to prevent the damaging of the fitting as a consequence of crashes against fixed obstacles.

The way in which the quick coupling device 60 with which the fitting 50 is provided works is quickly explained.

While the hydraulic cylinder 19 keeps the locking wheels 15 in the angular position of FIG. 4, the flange 12 of the pipe to be coupled can be drawn near the plate 13 by overcoming the cuts 24 of the wheels 15, and this also in the presence of relative movements of the fitting and the pipe to be coupled.

Once the flange 12 has reached the plate 13, the cylinder 19 is remotely manoeuvred in order to shorten itself and thus to determine through the toothed rim 16 and the pinions 17 the rotation, of the wheels 15 toward the angular position of FIG. 3.

Due to the effect of such rotation the helixes 25 of the wheels 15 get engaged with the flange 12 in such a way as to force the flange 12 to lean against the plate 13 and to firmly lock against it (FIG. 2).

The flat engagement, perpendicular to the axis of the fitting, that is thus provided between the terminal portions (36) of the helixes 25 and the back of the flange 12 prevents the stresses being exerted onto the flange 12 from determining inverse rotations of the wheels 15 and the consequent loosening of the locking engagement between the two flanges 12 and 13.

In a simple, quick and secure way the stable and long-lasting coupling of the fitting to the flange 12 and to the relative pipe is thus obtained.

The invention claimed is:

1. A device for quick coupling of a pipe fitting to a flanged pipe, said device comprising:
   a coupling plate that is rigidly fastened to one end of the pipe fitting so as to be axially approachable to a front of a terminal flange of the flanged pipe;
   at least three locking wheels rotatable around their respective axes and projecting axially from said coupling plate in circumferentially spaced positions;
   remotely controllable means for controlling the rotation of said locking wheels around their respective axes;
   wherein each of the locking wheels has a cord truncated circular shape that allows passage of the terminal flange among said locking wheels for reciprocal approach to and movement away from the coupling plate when said locking wheels rotate to one angular position that cords of the locking wheels where the locking wheels are truncated face an axis of the pipe fitting;
   wherein all other angular positions of said locking wheels prevent passage of the terminal flange among said locking wheels;
   wherein each of said locking wheels has a helical shoulder member surrounding a shaft of the locking wheel, said helical shoulder member causing front abutment engagement and locking of said terminal flange against said flanged plate as a result of rotation of the locking wheels from said one angular position to said other angular positions;
   wherein said helical shoulder member of each of the locking wheels has a flat terminal portion at a distal end of the locking wheel, and said terminal portion is perpendicular to the axis of the pipe fitting when the locking wheel is rotated to said one angular position;
   wherein each of said locking wheels has an axis that is inclined with respect to an axis of the coupling plate; and
   wherein said remotely controllable means comprise a hydraulic cylinder that causes rotation of a toothed rim around the axis of said coupling plate, said toothed rim being in engagement with respective pinions splined to shafts of said locking wheels.

2. The device according to claim 1, wherein said toothed rim is rotatably held by an additional plate integral and coaxial with said coupling plate and said hydraulic cylinder interacts between said additional plate and said toothed rim.

\* \* \* \* \*